(12) United States Patent
Ke et al.

(10) Patent No.: US 6,206,185 B1
(45) Date of Patent: Mar. 27, 2001

(54) MEDIA STORAGE DISK CASE

(75) Inventors: Qing Gang Ke; Wen Lien Wang, both of Quarry Bay (HK)

(73) Assignee: Chin Shing Magnetic Limited, Quarry Bay (HK)

(*) Notice: Subject to any disclaimer, the term of this patent is extended or adjusted under 35 U.S.C. 154(b) by 0 days.

(21) Appl. No.: 09/456,231

(22) Filed: Dec. 7, 1999

(30) Foreign Application Priority Data

Dec. 7, 1998 (CN) .................................................. 98249418

(51) Int. Cl.[7] .................................................. B65D 85/57
(52) U.S. Cl. ........................................ 206/308.1; 206/310
(58) Field of Search ............................... 206/308.1, 309, 206/310, 311, 312, 313, 232

(56) References Cited

U.S. PATENT DOCUMENTS

| 5,251,750 | 10/1993 | Gelardi et al. ................... 206/310 |
| 5,788,068 | 8/1998 | Fraser et al. ..................... 206/310 |
| 5,988,375 | * 11/1999 | Chang ............................. 206/308.1 |
| 6,016,909 | * 1/2000 | Chang ............................. 206/308.1 |

FOREIGN PATENT DOCUMENTS

| 3425 579 A1 | 1/1986 | (DE) . |
| 37 15 187 A1 | 11/1988 | (DE) . |
| 0 356 539 A1 | 3/1990 | (EP) . |
| 0 429 195 A2 | 5/1991 | (EP) . |
| 2 243 145 | 10/1991 | (GB) . |
| 404057778 | 2/1992 | (JP) . |
| 405051082 | 3/1993 | (JP) . |
| WO 93/01598 | 1/1993 | (WO) . |

* cited by examiner

Primary Examiner—Jacob K. Ackun
(74) Attorney, Agent, or Firm—Christie, Parker & Hale, LLP

(57) ABSTRACT

The present invention relates to a disk case made of plastics material which comprises a case, body and a cover which can be snapped locked to the body to enclose a disk. The disk is retained by the body of the case by a snap button. The snap button has a lip which engages at the central aperture of the disk to provide a downward force onto the upward surface of the disk. The snap button is mounted on a flexibly ridged arm extending from the body of the case and allows for the snap button to be moved from an engaged to a disengaged condition with the disk.

25 Claims, 5 Drawing Sheets

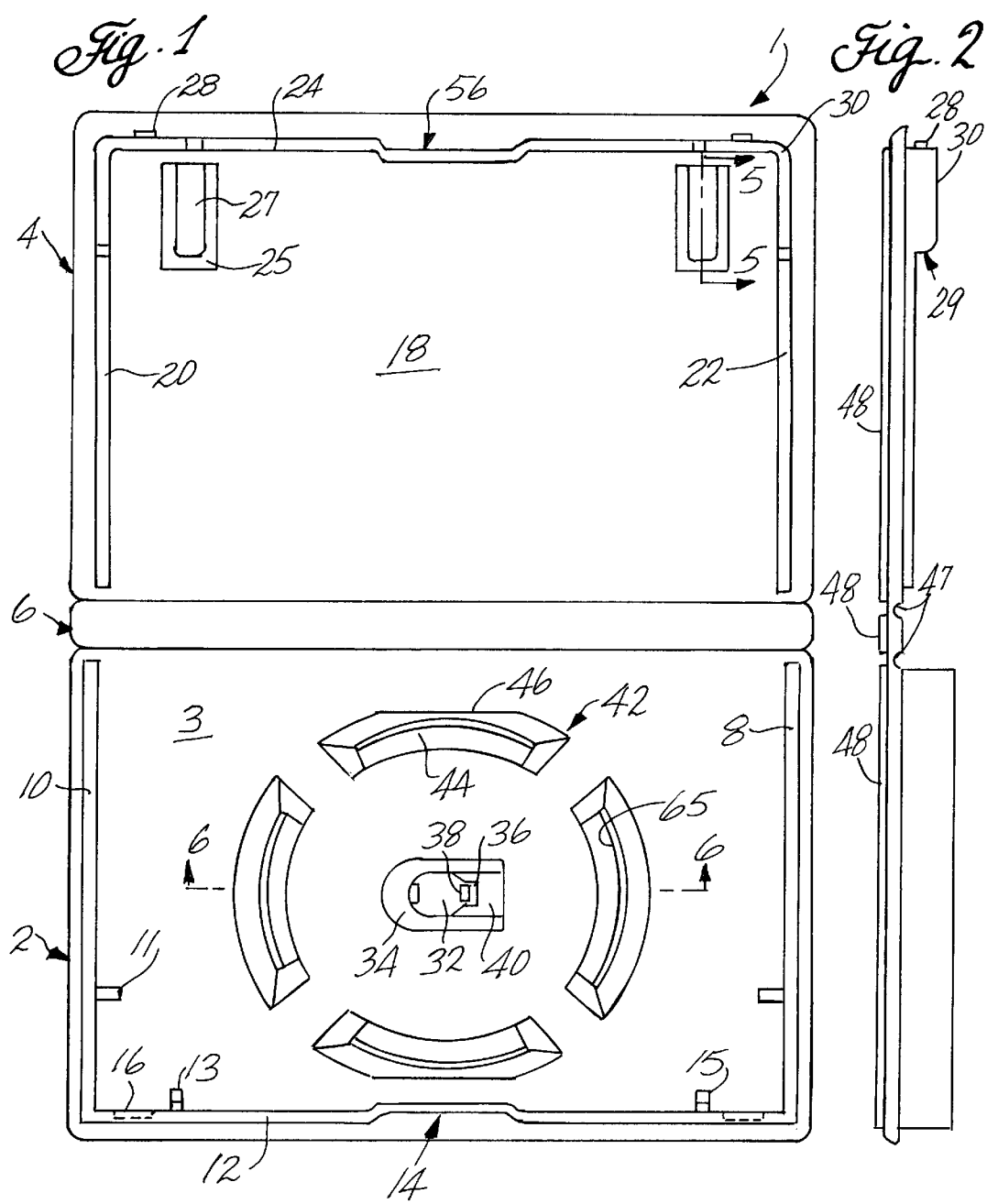

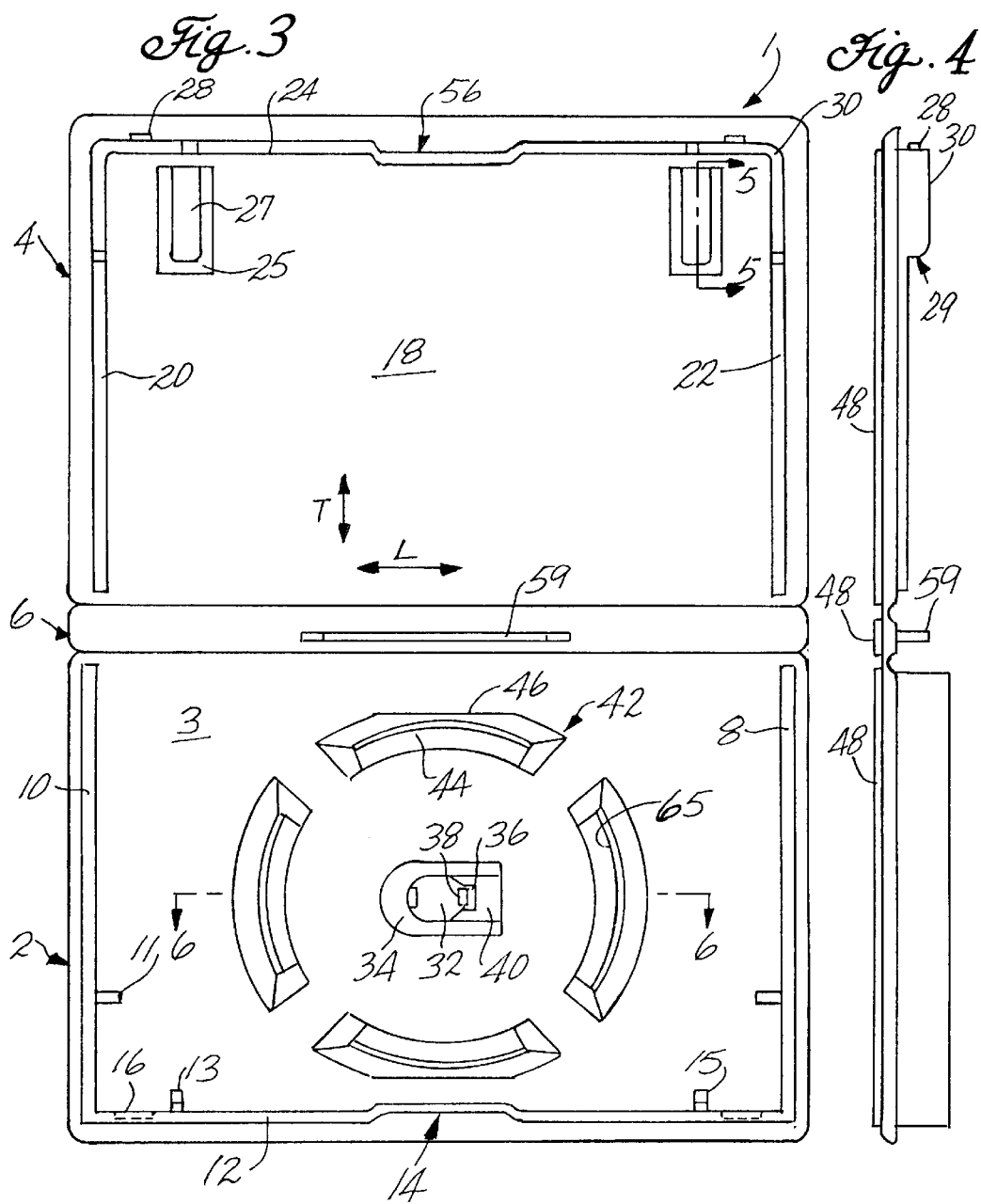

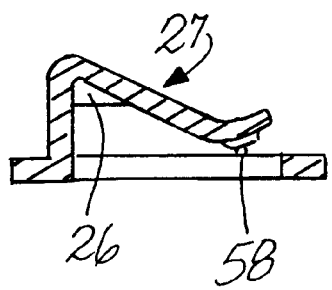
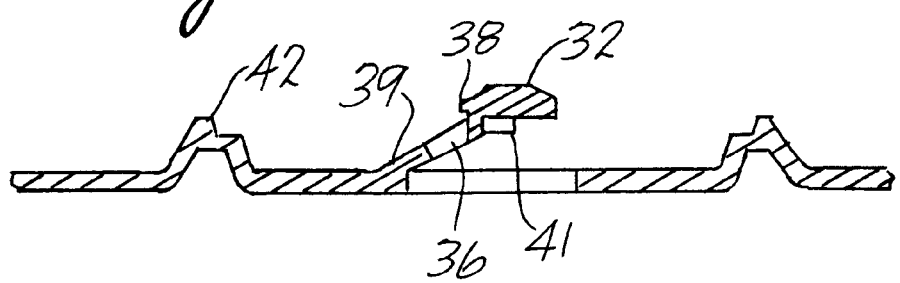
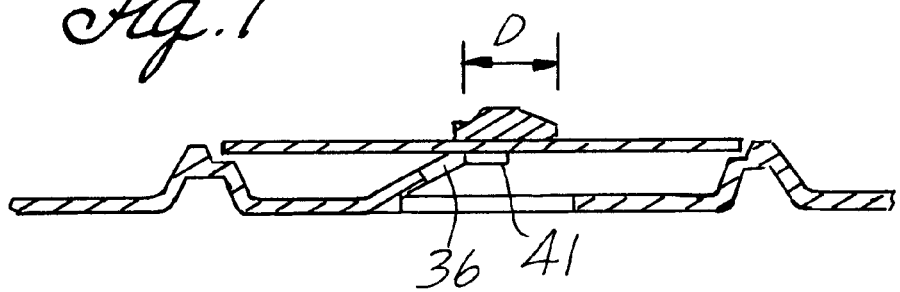

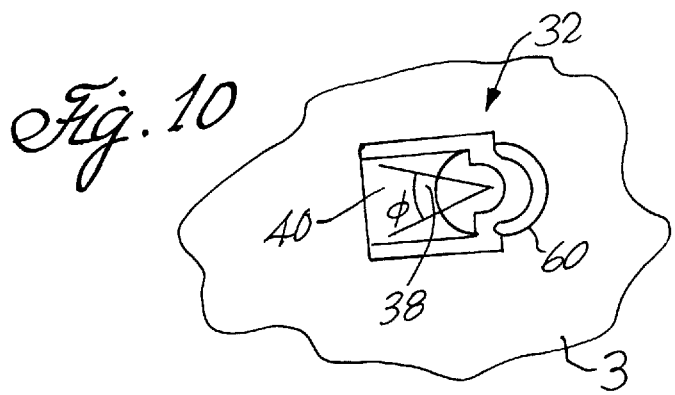
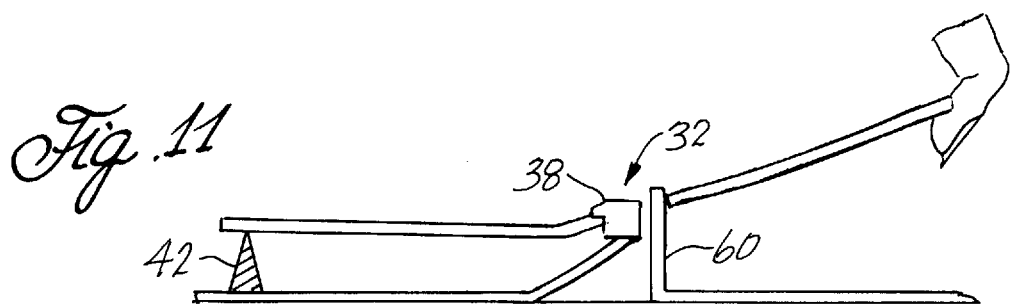
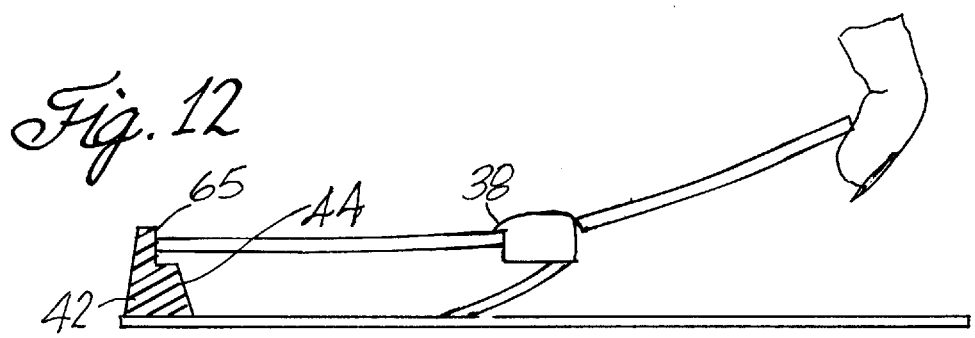

MEDIA STORAGE DISK CASE

FIELD OF INVENTION

The present invention is an improvement in or relating to a media storage disk case.

BACKGROUND TO THE INVENTION

Media storage disks such as compact disks (CD), digital video disks (DVD) or video compact disks (VCD) have rapidly gained popularity with consumers. For the purposes of retail, transportation, and storage by the end user, such disks are normally provided contained within a case. Different types of CD, VCD or DVD cases are known. Such normally include a disk engaging means which is arranged such that when it is pressed, the perimeter profile of the engaging means changes and reduces the degree of hold that it provides to the disk.

The construction of such disk engaging means is complex.

It is therefore an object of the present invention to provide improvements in or relating to a media storage disk case which will at least provide the public with a useful choice.

BRIEF DESCRIPTION OF THE INVENTION

Accordingly in a first aspect the present invention consists in a media storage disk case, for a media storage disk of a kind including a central aperture, said case comprising;

- a body portion having a substantially planar base, for receiving a media storage disk, wherein the plane of said disk is substantially parallel to the base,
- a first disk engaging member to engage onto part of the outwardly facing surface of said disk at no more than half of the perimeter of said central aperture,
- said first disk engaging member cantilevered from said body portion on a resiliently flexible arm extending at an angle away from said body portion,
- a second disk engaging member to provide support at part of the downwardly facing surface and to at least the same said half of said disk,
- a third disk engaging member provided to engage with said disk to prevent movement of said disk in at least a direction of said half of said disk,
- wherein said first engaging member is able to move from a first condition for engagement with said disk, to a second condition towards said body and disengaged from said disk, whilst said second disk engaging means provides the upward support to said disk.

Preferably said first disk engaging member engages onto part of the outwardly facing surface of said disk at said central aperture, at less than half the perimeter of said central aperture.

Preferably said disk engaging member engages onto the outwardly facing surface at the edge of the central aperture of said disk at less than a 60° quadrant.

Preferably said angle of said arm is defined in a plane normal to the substantially planar base.

Preferably said angle has a longitudinal component and a vertical component to position said first disk engaging member at a height above said substantially planar base.

Preferably the end of said arm forms or has engaged thereto a push button member engagable by the digit of as user of the case to allow the selective pressing of said button to thereby move said first disk engaging member to or towards said second condition.

Preferably said second disk engaging member is at least one upstand from said body portion to be in contact, at least when an undesired removal force is applied to said disk, with part of the downward surface of said disk.

Preferably said second disk engaging member is an upstand of said body to be in contact with the downward surface at the perimeter region of said disk.

Preferably said upstand is a rim provided to underlie the entire perimeter region of said disk, save for at least one relief, or gap.

Preferably the height of said relief or gap is substantially equal to the height of said upstand.

Preferably there are four reliefs provided in the upstand.

Preferably each relief is of a width to allow at least a portion of a digit of a user to insert therethrough, to provide an uplifting force to the outward perimeter edge of said disk.

Preferably said third disk engaging member prevents movement of said disk in substantially all directions parallel to the plane of said disk.

Preferably said third disk engaging member is a ridge providing a substantially vertically (normal to the plane of the disk) extending surface.

Preferably said vertically extending surface is provided by said upstand of said body.

Preferably movement of said disk in at least a direction of said half of said disk is also restrained by a member provided to engage against the edge of said central aperture substantially at least diametrically across from where said first disk engaging member engages onto the disk.

Preferably such is provided by the opposite edge of said push button member.

Alternatively such is provided by a lip extending from the planar base of said body portion.

Preferably said lip extends from said planar base to have some degree of flexible rigidity.

Preferably said push button provides a region to contact the edge of said central aperture substantially immediately adjacent said first disk engaging member to prevent said disk from moving in a direction substantially parallel to the plane of the disk, in a direction away from said half.

Preferably there is only one first disk engaging means, located on one cantilevered arm.

Preferably said body portion has a cover portion hingedly engaged thereto.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

BRIEF DESCRIPTION OF DRAWINGS

One preferred form of the present invention will now be described with reference to the accompanying drawings in which;

FIG. 1 is a plan view from above of the disk case according to the present invention when it is opened;

FIG. 2 is a side view of the disk case according to the present invention

FIG. 3 is a plan view from above of the disk case accordingly to an alternative version of the present invention when it is in an open condition;

FIG. 4 is a side view of the disk case according to FIG. 3;

FIG. 5 is a cutaway view along A—A of the disk case according to the present invention;

FIG. 6 is another cutaway view along B—B of the disk case according to the present invention;

FIG. 7 is a cut away view along B—B illustrating in situ, the presence of a disk;

FIG. 10 illustrates a sequence that the disk engaging means, to show the manner in which a disk can be released therefrom.

FIG. 11 illustrates how the application of a lifting force applied to the disk retained by the case, is prevented release from the disk engaging means as a result of vertical support and longitudinal support by the provision of the vertical support means 42 and the longitudinal support provided by the lip 60 in combination with the snap button 32, and FIG. 12 illustrates how the application of a lifting force applied to the disk retained by the case, is prevented release from the disk engaging means as a result of longitudinal support, and Referring to the accompanying drawings, a best mode embodiment will now be described in detail.

DETAILED DESCRIPTION

Figure 8:
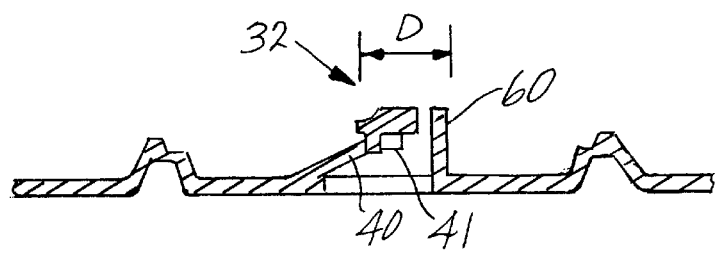
FIG. 8 is another cut away along B—B of an alternative configuration of the securing means.

The present invention relates to a disk case 1, comprising a case body 2, a case cover 4, and a linking portion 6. For the convenience of description, we hereinafter refer to the direction parallel to the longer edge of the said linking portion as longitudinal (L), the direction perpendicular to it as transverse (T), and the direction normal to the plane of the paper as vertical (V).

With reference to FIGS. 1 and 2, the said case body 2 comprises a bottom 3, of a substantially planar base and side walls 8, 10, and 12. The bottom 3 is preferably a rectangular piece of thin plate with a certain thickness, having four round corners. On the inner side of the said bottom 3, with the exception of the side towards the linking portion 6, on all the other three sides there are formed vertically extending side walls, 8, 10, 12. Substantially in the middle of the side wall 12, which is opposite to the said lining portion 6, there is formed a recessed or sunken portion 14 provided for the convenience of opening the disk cage 1. The other two side walls 8 and 10 are also located a little distance from the edges of the bottom 3, and all the three side walls 8, 10, and 12 are preferably of equal height, their thickness being approximately the same as that of the material of said bottom 3.

It is seen that at both ends at the inner side of the side wall 12, there are formed two slots 16, of a concave or recesses nature provided to engage with the protrusions 28 on the upper surface of the wall 24 of the cover 4. So that said cover 4 can be reliably snapped to the said case body 2, there are provided at least two ribs 13, preferably half as high as the side wall. Preferably there are provided two close to both ends of the side wall 12. Between said ribs 13 and said side wall 12, there are provided slots 15, for the purposes of providing support to the side wall 24 on the cover 4. The side walls 8 and 10 are preferably also provided with ribs 11 located near the side wall 12. They act to reinforce the side walls 8 and 10, and also assist to support the cover 4.

In the centre of the bottom 3, there is provided an opening 34, of which the two longitudinal edges and the right edge are straight lines while the left edge is curved. An arm 40 extends slanting from the said right edge of the opening. Said arm 40 is preferably of flexible but resilient nature and comprises a slanting portion 39 and a horizontal portion 41. Extending from the top of said slanting portion 39, there is formed an opening 36. On the said horizontal portion 41 there is provided a snap button 32. Said snap button 32 can be round in shape, or of other suitable shape, so long as it can snap tight over the inner edge of the central hole in a disk. The snap button 32 is further provided with a protrusion 38 which could be considered a catch, where it neighbours the said arm. The catch provides a first disk engaging member and is able to provide a downwards force onto an upper surface of said disk. So that when a disk is snapped on the said snap button 32, said protrusion or catch 38 can prevent the disk from slipping off in an upward (vertical) direction from the snap button 32. The catch is preferably provided on the push button to engage with less than half of the perimeter of the aperture at said disk. Preferably the catch engages with less than half of said disk at said aperture and preferably it engages at less than a 60° quadrant of said aperture, which as for example shown in FIG. 10 is designated as Ø. The presence of the catch at less than half of the circumference of the aperture of the disk will allow for the push button to be pushed downwardly in a vertical condition and slip from the engagement with the upper surface of the disk. Further, on the inner side of the bottom 3, there are formed a multiple of ridges 42 preferably along a circle about said snap button 32 as the centre. Said ridges 42 form part of an upstand from the base of the body, and are preferably provided with steps or platforms 44, said steps 44 provide the preferred form of the second disk engaging means assisting to support or prevent unwanted uplifting of the disk together with the said snap button 32. The vertical walls of the steps serve to provide the preferred form of the third disk engaging means. Alteratively or in addition this means may be provided by the other side of said snap button or the lip 60. The upstand providing the ridges 42 near the linking portion 6 and the side wall 12 may have cut off parts 46 to reduce size. Moreover, said ridges 42 may be hollow to save material.

The case cover 4 comprises a base plate 18 and side walls 20, 22 and 24. The base plate 19 is a thin plate, preferably rectangular in shape and of similar thickness as that of the case body 2, also having four round corners. On the inner side of said base plate 18, with the exception of the side towards the linking portion 6, on all the other three sides, there are provided vertically extending side walls 20, 22 and 24, all located at a certain distance from the edges of the cover, such that when the disk case 1 is closed, said side walls 20, 22, and 24 on said cover 4 all come into contact with the inner sides of the walls 8, 10, and 12 on the case body 2, resulting in a tight fit of the cover and the case body. Similarly, in the middle of the side wall 24, there is also a recessed or sunken portion 56, matching the recessed or sunken portion 14 on the side wall 2 of the case body 2. The side walls 20, 22, and 24 are a little lower in height than the side walls 8, 10, and 12 on the case body, but are of same thickness. Near the place where side walls 20 and 22 connect the side wall 24, there are formed protrusions 30, such protrusions 30 having each a slope 29 formed at one end. At the outer side of both ends of the side wall 24, there are formed two protrusions 28, to engage with the slots 16 in the side wall 12 on the case body 2, so that said cover 4 can be tightly snapped on the said case body 2. On the base plate 18 near both ends of the said side wall 24, there are preferably formed two rectangular openings 25 which possess each resilient leg 27, preferably substantially " shaped in cross section (see FIG. 3). The legs 27 are located at the inner side with respect to the wall 24. Each leg has a slanting portion and a vertical portion, with a rib 26 provided between the said two portions. Near the end of the said slanting portion of the said leg, there is also preferably provided a protrusion 58. The legs act to hold information sheet(s) placed inside the disk case.

The linking portion 6 is a narrow rectangular thin plate, of the same thickness as the bottom 3 of the case body 2, and also preferably having four round corners. The width of said linking portion 6 just equals to the height of the disk case 1, and its longitudinal size is identical with that of the disk case 1, as shown in FIG. 2. Said cover 4, case body 2, and linking portion 6 are formed integrally, whereby said linking portion 6 connects to said case body 2 and said cover 4 through two thinned strips 47.

The outer side of the disk case of the present invention is preferably wrapped with a transparent thin plastic film. Said thin plastic film is fixed to the disk case at at least both longitudinal sides, but preferably with the transverse sides not fixed to it, so that information sheets can be inserted in between the said film and the disk case. In addition, on the outer side of the case cover, there are provided protruding edges 48 (refer to FIG. 2), so as to protect the said thin plastic film lest it should be worn out.

The disk case according to the present invention can be made of elastic polymerized material, such as polypropylene, through moulding procedures.

FIGS. 3 and 4 illustrate an alternative to the present invention wherein there is a provision of tongue providing means which protrudes from the inner wall of the case. This provision allows for further securing of the disk when the case is in a closed condition. The tongue 59 is provided on the linking portion 6. The tongue is preferably situated such that it can, when the case is in a closed condition, come in contact with the disk contained by the body of the case. When in a closed condition, the tongue travels to a condition to lie on the outward facing surface of the disk to effectively clamp the disk to the body and thereby further prevent the disk from being dislodged.

FIG. 8 illustrates in cross section an alternative arrangement of the snap button 32 which in conjunction with a lip 60 extending from the body of the cover, is designed to retain a disk at its central aperture. Although the version of the snap button illustrated in FIGS. 1 and 6 is sufficiently suitable to received and retain a disk, since the production of the present invention is preferably by injection moulding, and as injection moulding can include post injection shrinkage, it can be difficult to size the snap button 32 to the appropriate dimensions to receive and be able to obtain a disk. It is to this extent that the preferred version as shown in FIG. 8 includes a snap button which in conjunction with that portion supported by the arm 40 allows for a disk to be received thereon and over the lip 60. As a result of the distance D (being substantially identical to the size of the aperture of the disk) being more flexible in size in the arrangement as shown in FIG. 8 since the lip 60 is removed from the snap button and is resiliently flexible, the shrinkage aspect of injection moulding is not as crucial as in the version of the snap button as shown in FIG. 7 wherein the distance D will not vary in post moulding. The lip 60, as it is preferably made of the same plastics material as the body, will have a degree of flexible resilience towards the portion of the snap button 32 located on the arm 40. If D is not greater than the diameter of the disk hole, the flexible nature of the lip will still allow the disk to slide over it and to be retained by the catch.

Figure 9:
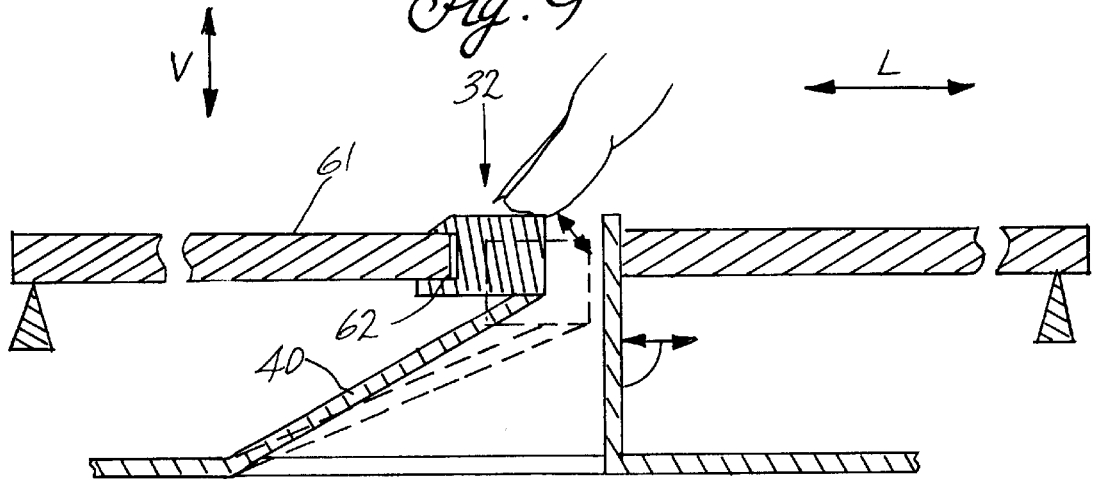
FIG. 9 is a view of section B—B of FIG. 8 illustrating a disk in situ.

With reference to FIG. 9, upon pressing the portion of the button mounted on the arm 40, the catch 38 moves to a second condition which is disengaged from the upper surface of the disk. In this condition, the disk is free to be lifted from the case.

In the engaged condition where the catch 38 is located on the upper surface of the disk at the aperture, the resultant forces prevent the disk from removal or from being removed easily. With reference to FIG. 11, in combination with the vertical support preferably provided by the ridge 42, the lifting of the disk when the button is in its first, engaged condition, is virtually impossible. The lip 60 prevents the disk from sliding longitudinally towards a disengaged condition (i.e. from underneath the catch) and the vertical support provided by member 42 prevents the disk from being lifted over the lip 60. In this configuration the member 42 preferably provides a support in the vertical direction as for example shown in FIG. 11.

In the version of the button as shown in FIGS. 6 and 7, where there is little or no longitudinal enforcement of the disk by the button (i.e. the aperture of the disk can, with a slight lift, be slid longitudinally over the button) the support of the upstand needs to provide a surface to force the disk to remain in its longitudinal location. That is, once the disk is lifted upwardly as shown, the longitudinal support to ensure engagement of the catch with the upper surface of the disk is achieved by the substantially vertically extending wall 65 of the upstand 42. In the most preferred form the member 42 provides both vertical and longitudinal support irrespective of the type of catch that is used to retain the disk. Whilst in an engaged condition, the disk need not, in its natural rest position, be in contact with the support providing means 42 and there may hence be some clearance, the proximity of the support provided by the member 42 is sufficiently close that when a force is applied, contact will be achieved before the disk manages to become disengaged from the button. Although were herein reference is made to the word longitudinally in respect of the support provided by the platform 44 of means 42, the direction can equally be a transverse direction and in essence is merely referring to a direction in which the disk would need to travel, in order to move to a disengaged condition by moving from underneath the catch (such that the catch is no longer engaged with the upward surface of the disk i.e. parallel to the plane of the disk). Where vertical support is not directly applied to the disk when the disk is in an engaged condition by the platform 44 of member 42, such vertical support may entirely or at least in part also be provided by a ledge 62 provided preferably as part of the push button 2. When in the engaged condition, the disk can be in contact with the ledge 62 and provide the vertical support to the downwardly facing surface of the disk. Such support may also be provided on the lip 60 to provide a similar vertical support to the downwardly facing surface of the disk immediately adjacent the lip 60.

With reference to FIG. 10 the lip 60 is preferably semi circular in shape when viewed from above, but may be of a smaller arcuate form or may indeed consist of more than one separate lip. The lip is in effect an upstand from the base of the body of the case.

With reference to FIG. 9, upon the pressing of the push button 32, the catch 38 moves from its first condition to its second disengaged condition as a result of the pivoting of the push button along a path defined by the movement of the arm 40. The arm 40 extends from the base of the body of the case in a direction which has both a vertical and longitudinal component. The catch has its engaging portion (preferably a downwardly facing surface) extending from the arm in a longitudinal direction which is substantially opposite to the longitudinal direction in which the arm extends from the base of the body of the case. The point at where the arm extends from the base underlies the disk at substantially the same quadrant of the disk where the catch engages onto the upwardly facing surface of the disk.

The upstands 42 are preferably discontinuous. That is, there is a gap provided between an at least one ridge and with reference to FIG. 1 at least four ridges. The gaps serve the purpose of allowing for a digit of the user to grasp the side or underneath of the disk, and simultaneous or subsequent to pressing the button, allow uplifting of the disk from the case.

For disengaging the disk, the button can be pressed and allow the catch to be pushed below the disk. This can be achieved provided the disk does not move in the plane of the disk. The catch when the button is pressed, will move from the inner edge at the aperture of the disk towards the centre of the hole. The disk will not move sideways (in a plane of the disk) if either there is a second disk engaging means along the outside edge circumference or if there is a wall section or some guiding means along the inner circumference of the disk, opposite the catch.

What is claimed is:

1. A media storage disk case, for a media storage disk of a kind including a central aperture, said case comprising:
    a body portion including a substantially planar base,
    one push button receivable in the central aperture of the disk, the one push button cantilevered from said base by at least one resiliently flexible arm extending at an angle away from said base,
    said one push button providing a catch to, when the disk is received by said push button, engage on an outwardly facing surface of the disk, said catch provided to engage the outwardly facing surface of said disk at no more than half of the perimeter of said central aperture, wherein any structure of the disk case that is receivable in the central aperture of the disk, including the one push button, is without a catch along the other half of the perimeter of said central aperture to engage on the outwardly facing surface of the disk when the disk is received by the push button,
    an upward support member to locate with a downwardly facing surface of the disk when engaged with said push button, to support said disk above said base,
    a longitudinal disk support member which when the disk is engaged with said one push button is engagable with an edge of said disk to prevent release of said disk from said catch,
    wherein when a disk is engaged with said one push button and said one push button is depressed, it moves from a first condition where said catch is engaged with the outwardly facing surface of said disk, to a second condition towards said base where said catch is released from the outwardly facing surface of said disk, to allow release of said one push button from the central aperture.

2. A media storage disk case as claimed in claim 1 wherein said catch engages onto the outwardly facing surface of said disk at said central aperture, at less than half the perimeter of said central aperture.

3. A media storage disk case as claimed in claim 1 wherein said catch engages onto the outwardly facing surface at the edge of the central aperture of said disk at less than a 60° quadrant.

4. A media storage disk case as claimed in claim 1 wherein said angle of said arm is defined in a plane normal to the substantially planar base.

5. A media storage disk case as claimed in claim 1 wherein said angle has a longitudinal component and a vertical component to position said catch at a height above said substantially planar base.

6. A media storage disk case as claimed in claim 1 wherein an end of said arm forms the push button.

7. A media storage disk case as claimed in claim 1 wherein said upward support member is at least one upstand from said body portion to be in contact, at least when an undesired removal force is applied to said disk, with part of the downward surface of said disk.

8. A media storage disk case as claimed in claim 1 wherein said upward support member is an upstand of said body portion to be in contact with the downward surface at the perimeter region of said disk.

9. A media storage disk case as claimed in claim 8 wherein said upstand is a rim provided to underlie the entire perimeter region of said disk, save for at least one relief, or gap.

10. A media storage disk case as claimed in claim 9 wherein the height of said at least one relief or gap is substantially equal to the height of said upstand.

11. A media storage disk case as claimed in claim 9 wherein there are four reliefs provided in the upstand.

12. A media storage disk case as claimed in claim 11 wherein each relief is of a width to allow at least a portion of a digit of a user to insert therethrough, to provide an uplifting force to the outward perimeter edge of said disk.

13. A media storage disk case as claimed in claim 1 wherein said longitudinal disk support member prevents movement of said disk in substantially all directions parallel to the plane of said disk.

14. A media storage disk case as claimed in claim 1 wherein said longitudinal disk support member is a ridge providing a substantially vertically extending surface, normal to the plane of the planar base.

15. A media storage disk case as claimed in claim 14 wherein said upward support member is an upstand of said body portion to be in contact with the downward surface at the perimeter region of said disk and wherein said vertically extending surface is provided by said upstand from said body portion.

16. A media storage disk case as claimed in claim 1 wherein said longitudinal support member includes a member provided to engage against the edge of said central aperture substantially at least diametrically across from where said catch engages onto the disk.

17. A media storage disk case as claimed in claim 16 wherein such member is provided by the opposite edge of said push button member.

18. A media storage disk case as claimed in claim 17 wherein such member is provided by a lip extending from the planar base of said body portion.

19. A media storage disk case as claimed in claim 18 wherein said lip extends from said planar base to have some degree of flexible rigidity.

20. A media storage disk case as claimed in claim 6 wherein said push button provides a region to contact the edge of said central aperture substantially immediately adjacent said catch to prevent said disk from moving in a direction substantially parallel to the plane of the disk, in a direction toward said region.

21. A media storage disk case as claimed in claim 1 wherein there is only one push button, located on one cantilevered arm.

22. A media storage disk case as claimed in claim 1 wherein said body portion has a cover portion hingedly engaged thereto.

23. A media storage disk case assembly, comprising:
   a media storage disk of a kind including a central aperture, and;
   a case, said case comprising:
      a body portion including a substantially planar base,
      one push button located in the central aperture of the disk, the one push button cantilevered from said base by at least one resiliently flexible arm extending at an angle away from said base,
      said one push button providing a catch to engage on an outwardly facing surface of the disk, said catch to engage the outwardly facing surface of said disk at no more than half of the perimeter of said central aperture, wherein any structure of the disk case that is received in the central aperture of the disk, including the one push button, is without a catch along the other half of the perimeter of said central aperture to engage on the outwardly facing surface of the disk,
      an upward support member to locate with a downwardly facing surface of the disk to support said disk above said base,
      a longitudinal disk support engagable with an edge of said disk to prevent release of said disk from said catch,
   wherein when said one push button is depressed, it moves from a first condition where said catch is engaged with the outwardly facing surface of said disk, to a second condition towards said base where said catch is released from the outwardly facing surface of said disk, to allow release of said one push button from the central aperture.

24. The media storage disk case assembly of claim 23, wherein the longitudinal disk support member is a substantially vertically extending surface, normal to the plane of the base and located at an edge on the outer perimeter region of said disk.

25. The media storage disk case assembly of claim 23, wherein the longitudinal disk support member is a substantially vertically extending surface, normal to the plane of the base and located at an edge of said central aperture substantially at least diametrically across from where said catch engages onto the disk.

\* \* \* \* \*